(12) United States Patent  
Sorenson et al.

(10) Patent No.: US 9,348,700 B2
(45) Date of Patent: May 24, 2016

(54) ROLLBACK COUNTERS FOR STEP RECORDS OF A DATABASE

(71) Applicant: Unisys Corporation, Blue Bell, PA (US)

(72) Inventors: Ellen L. Sorenson, Roseville, MN (US); Jane Muccio, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 150 days.

(21) Appl. No.: 13/782,306

(22) Filed: Mar. 1, 2013

(65) Prior Publication Data

US 2014/0250085 A1 Sep. 4, 2014

(51) Int. Cl.
*G06F 7/00* (2006.01)
*G06F 17/00* (2006.01)
*G06F 11/14* (2006.01)
*G06F 17/30* (2006.01)

(52) U.S. Cl.
CPC ........ *G06F 11/1402* (2013.01); *G06F 11/1471* (2013.01); *G06F 17/30286* (2013.01); *G06F 2201/80* (2013.01)

(58) Field of Classification Search
None
See application file for complete search history.

(56) References Cited

U.S. PATENT DOCUMENTS

| 6,714,904 | B1* | 3/2004 | Torvalds et al. ................. 703/26 |
| 6,769,074 | B2* | 7/2004 | Vaitzblit ............. G06F 11/1471 707/999.201 |
| 9,111,265 | B2* | 8/2015 | Sorenson ............... G06Q 20/00 |
| 2002/0132613 | A1* | 9/2002 | Leung et al. .................. 455/414 |
| 2006/0074977 | A1* | 4/2006 | Kothuri et al. ............. 707/104.1 |
| 2006/0218206 | A1* | 9/2006 | Bourbonnais ..... G06F 17/30377 |
| 2007/0266256 | A1* | 11/2007 | Shah ..................... G06F 21/725 713/178 |
| 2008/0244354 | A1* | 10/2008 | Wu et al. ....................... 714/755 |
| 2008/0294648 | A1* | 11/2008 | Lin et al. ......................... 707/10 |
| 2010/0299509 | A1* | 11/2010 | Doi et al. ....................... 712/241 |
| 2011/0246503 | A1* | 10/2011 | Bender et al. ................. 707/769 |
| 2012/0109895 | A1* | 5/2012 | Zwilling et al. .............. 707/648 |

\* cited by examiner

*Primary Examiner* — Tuan A Pham
(74) *Attorney, Agent, or Firm* — Richard J. Gregson

(57) ABSTRACT

A rollback record may be created for each step identifier (ID). The rollback record indicates how many times the step record identified by the step ID has been rolled back during operation of the database. The rollback record may be stored in a periodic save record (PSR), separate from or stored in an audit trail containing the step records. By processing the rollback records in the periodic save record during a recovery, a database may identify a time on an audit trail for initiating a recovery prior to the last resume point for a step without going back in the audit trail to a time before the initial start of the step.

12 Claims, 7 Drawing Sheets

600

| PERIODIC SAVE RECORD (PSR) | |
|---|---|
| 602 STEP-ID | 604 ROLLBACK-COUNT |
| 1 | 0 |
| 2 | 2 |
| 3 | 1 |

FIG. 6

ROLLBACK COUNTERS FOR STEP RECORDS OF A DATABASE

FIELD OF THE DISCLOSURE

The instant disclosure relates to computer systems. More specifically, this disclosure relates to database management.

BACKGROUND

Databases are used to store a variety of information. For example, databases may track financial transactions, errors occurring in a computer system, and changes to a document file. These databases are often essential to the operation of a company. Thus, the databases must store the information, such that the information is quickly accessible on demand. Further, the databases must be resilient to errors, such that the databases can be quickly recovered should an error occur. One conventional technique for decreasing the down time of a database during recovery is to track changes to the database through an audit trail. When entries are changed in the database or new transactions entered to the database, the information may be stored as records in the audit trail.

Step IDs uniquely identify a single transaction or a series of transactions operating on the database. Step IDs may be used to track the progress of the transactions through database processing and maintain atomicity of the transactions. FIG. 1 illustrates a conventional step ID. Conventionally, a step ID 100 is a value comprising a combination of a first portion 102a that is time based, which may include an uniqueness sequence 102b within the time, and a second portion 104 that is an advance number. The advance number allows a user to commit a portion of transaction processing and resume processing, while retaining resources. The step ID structure of FIG. 1 may create problems in certain situations.

For example, the time-based portion 102a of the step ID 100 is a local time of the computer executing the transaction in the database. Changes in the local time, such as daylight saving time, can affect the accuracy of the step IDs. For example, if a database continues to generate step IDs during a time adjustment backwards, duplicate step IDs may be generated. That is, during a "fall back" of daylight saving time, duplicate step IDs may be generated for one hour. One conventional solution to this problem is to shut down the database for one hour while the clock catches up. However, because the databases are often critical to the operation of a company, shutting down the database is undesirable.

Databases may allow steps to commit to the database or roll back work in progress while continuing under the same step ID. Continuing use of the step ID, instead of starting a new step ID, improves performance by retaining resources acquired by the step. The advance portion 104 of the step ID may be used when a step commits the previous work and continues new work. That is, the advance portion 104 allows the database to separate transactions within a single step ID. Additionally, steps that roll back and continue to operate may retain the existing step ID. However, the continued use of an existing step ID can affect the database operations.

For example, if the advance portion 104 is incremented beyond a maximum value, such as 4095, the advance portion 104 will wrap-around and restart at zero. When the advance portion 104 wraps around, the database will have different transactions with duplicate identifiers. Duplicate identifiers cause data corruption during recovery.

In another example, if the database fails and a step ID is continued after a roll back in a commit-in-progress state, recovery could pick up and apply updates from the rolled back portion of that step ID, which causes data corruption. FIG. 2 is a flow chart illustrating a conventional method of recovering a database after a crash. At block 202, a last periodic save record (PSR) for the database is identified when recovery starts. At block 204, the database steps backwards through periodic save records to reach a periodic save record where none of the step IDs associated with the periodic save record is on a commit-in-progress list. At block 206, the database applies the updates in the audit trail on the commit-in-progress list to recover the database.

However, the conventional method of recovery shown in FIG. 2 may not always function correctly. When the advance number of the step ID is not incremented during a roll back operation, data may become corrupted during the recovery of FIG. 2. The data corruption occurs because if any of the steps on the commit-in-progress list have done a previous roll back, block 206 will apply updates done both before and after the rollback.

SUMMARY

A new step ID with a timestamp portion and an uniqueness portion may reduce or eliminate the likelihood of duplicate step IDs. The timestamp portion of the step ID may be created by counting units of time from a predefined time based on coordinated universal time (UTC). The UTC does not change for seasonal offsets, such as daylight saving time. Thus, even when local clocks are changed, the step IDs will continue to increment without duplicating step IDs.

Further, to avoid applying updates that were rolled back before a continued step, and reduce the amount of audit trail processed, a rollback while retaining the same step ID may include a rollback count. The rollback count counts the number of times a particular step ID has been rolled back. This rollback count may be stored in a periodic save record of the database, where the periodic save record may include one entry for each commit-in-progress step. The rollback count allows recovery to start processing the audit trail at a point prior to the last resume point for a step ID without going back in the audit trail to before the initial start of the step.

According to one embodiment, a method includes receiving a request to process a transaction on a database. The method also includes processing the transaction in the database. The method further includes assigning an identification number to the transaction. The step of assigning includes obtaining a current universal time that does not change with seasonal offsets. The step of assigning also includes obtaining a unique transaction identification value.

According to another embodiment, a computer program product includes a non-transitory computer readable medium having code to receive a request to process a transaction on a database. The medium also includes code to process the transaction in the database. The medium further includes code to assign an identification number to the transaction. The code to assign includes code to obtain a current universal time that does not change with seasonal offsets. The code to assign also includes code to obtain a unique transaction identification value.

According to yet another embodiment, an apparatus includes a memory and a processor coupled to the memory. The processor is configured to receive a request to process a transaction on a database. The processor is also configured to process the transaction in the database. The processor is further configured to assign an identification number to the transaction. Assigning the identification number includes obtaining a current universal time that does not change with seasonal offsets. Assigning the identification number also includes obtaining a unique transaction identification value.

According to a further embodiment, a method includes recording transaction updates to a database, the transactions identified by a step-id. The method also includes performing a first rollback of database processing on the database using the transaction updates. The method further includes recording a number of times the updates are rolled back. The method also includes recovering the database using the updates without applying updates previously rolled back in the first rollback.

According to another embodiment, a computer program product includes a non-transitory computer readable medium having code to record transaction updates to a database, the transactions identified by a step-id. The medium also includes code to perform a first rollback of database processing on the database using the transaction updates. The medium further includes code to record a number of times the updates are rolled back. The medium also includes code to recover the database using the transaction updates without applying updates previously rolled back in the first rollback.

According to yet another embodiment, an apparatus includes a memory for storing a database and a processor coupled to the memory. The processor is configured to record transaction updates to a database, the transactions identified by a step-id. The processor is also configured to perform a first rollback of database processing on the database using the transaction updates. The processor is further configured to record a number of times the updates are rolled back. The processor is also configured to recover the database using the updates without applying previously rolled back updates.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

FIG. 6 is a block diagram illustrating a periodic save record with rollback counters according to one embodiment of the disclosure.

DETAILED DESCRIPTION

Figure 3:
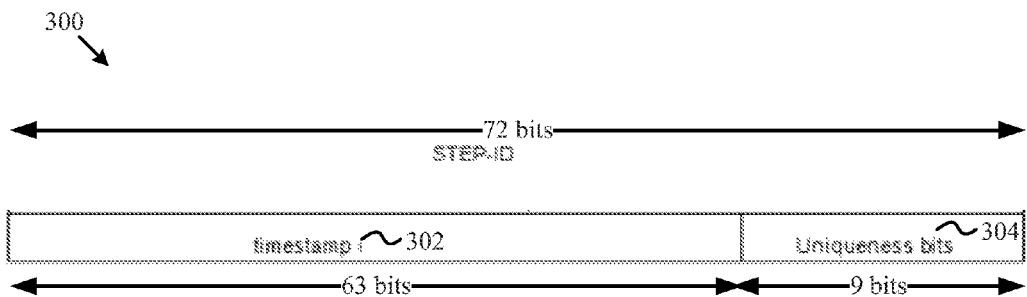
FIG. 3 is a block diagram illustrating an exemplary step identifier according to one embodiment of the disclosure.

FIG. 3 is a block diagram illustrating an exemplary step identifier according to one embodiment of the disclosure. A step identifier (ID) 300 may include a timestamp portion 302 and a set of uniqueness bits 304. The timestamp portion 302 may be a coordinated universal time (UTC) value. UTC times do not change with seasonal offsets, eliminating the potential duplicate step-ids for applications that continue processing in a time setback overlap period. According to one embodiment, the timestamp portion 302 is formatted as a number of nanoseconds since Dec. 31, 1899. The step ID 300 may be a 72-bit value with 63 bits assigned to the timestamp 302 and 9 bits assigned to the set of uniqueness bits 304.

To further ensure that duplicate step IDs 300 may be reduced or eliminated, a set of uniqueness bits may be amended to the timestamp 302 or replace a portion of the bits in the timestamp 302. For example, when only microsecond granularity is implemented in a system, the last 9 bits of a UTC timestamp may be shifted off the timestamp 302, because the last 9 bits provided accuracy to nanoseconds. Uniqueness bits 304 may thus be appended to the timestamp 302 to replace the shifted-off bits to ensure transactions begun in the same time interval, for example a given microsecond, have a unique step-id.

Figure 1:
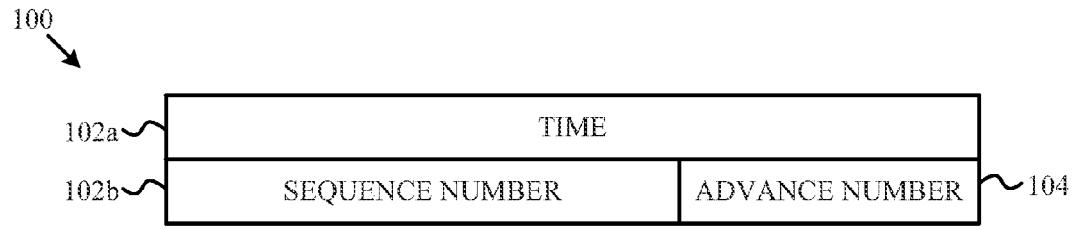
FIG. 1 illustrates a conventional step ID.
Figure 2:
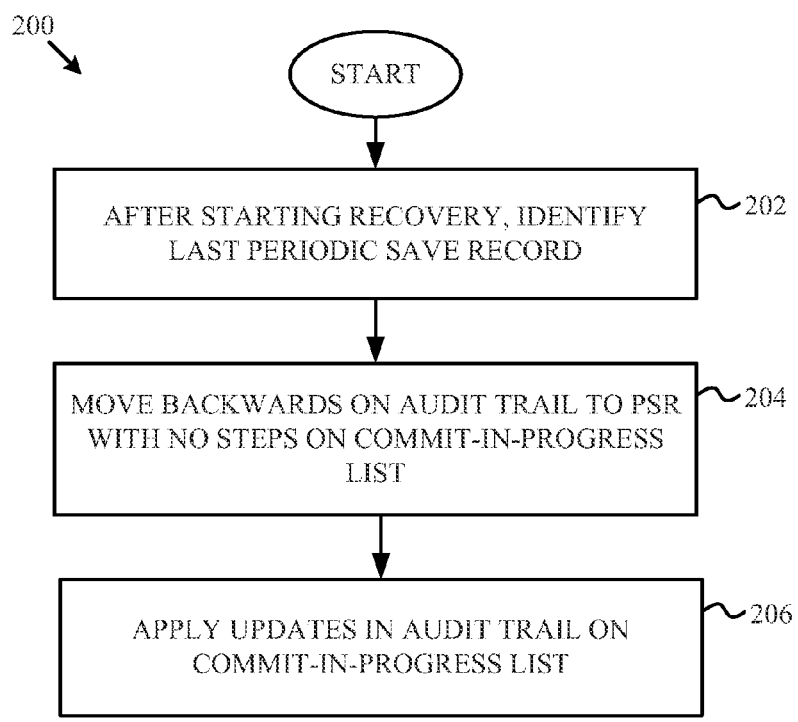
FIG. 2 is a flow chart illustrating a conventional method of recovering a database after a crash.

Compatibility of the exemplary step ID 300 of FIG. 3 with databases employing a conventional step ID 100 of FIG. 1 may be obtained by manipulating one bit of the step ID 300. For example, the timestamp 302 may not have the highest-ordered bit set to one for several thousands of years. A conventional time stamp, such as that in the step ID 100 of FIG. 1, may have a highest-ordered bit set for the years 1996 through 2027. Thus, a database may implement logic to identify when a step ID is in the conventional format of FIG. 1 and when a step ID is in the exemplary format of FIG. 3 by examining the highest-ordered bit. By recognizing different formats of step ID by examining only one bit, the database may continue to operate on transactions involving both formats of step IDs.

Figure 4:
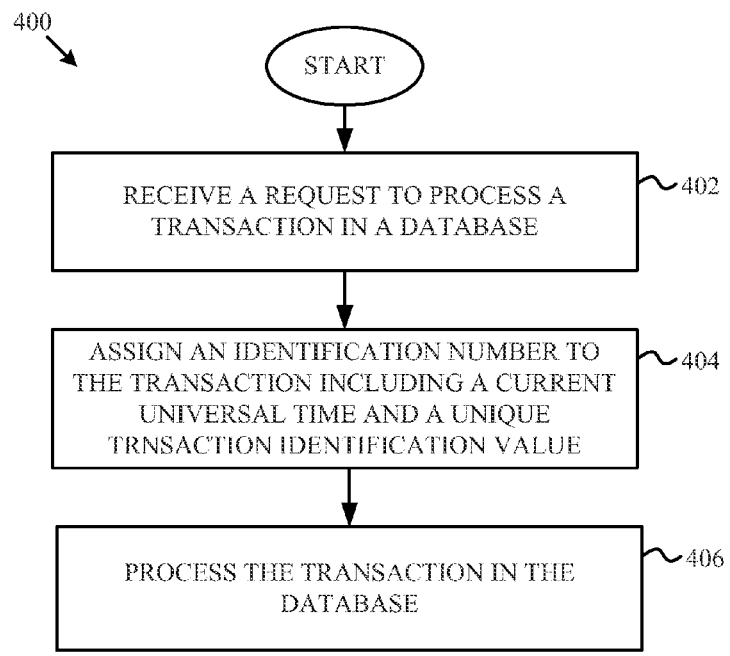
FIG. 4 is a flow chart illustrating an exemplary method for assigning a step identifier according to one embodiment of the disclosure.

A step, designated by a step ID as shown in FIG. 3, may be used to mark the beginning and end of a recoverable unit during program execution. That is, one or more transactions in a database, performed by a user application, may be tracked by a step ID. FIG. 4 is a flow chart illustrating an exemplary method for assigning a step identifier according to one embodiment of the disclosure. A method 400 may begin at block 402 with receiving a request to process a transaction in a database. At block 404, an identification number may be assigned to the transaction, and at block 406, the transaction in the database may be processed. The identification number may include a current universal time, such as a coordinated universal time, and a unique transaction identification value, such as a set of uniqueness bits.

The number of unique step IDs may be reached if the number of steps for a certain timestamp exceeds the number of unique values that can be represented by the number of assigned bits to the set of unique bits. For example, if the set of uniqueness bits include 9 bits, then a total number of 512 unique step IDs may exist for a certain time stamp. To avoid step ID wrap-around occurring, a step advance request may be assigned a new step ID. When a step is advanced, a new step ID may be generated, and the prior step ID may be retained and audited (to enable linking the original and advanced steps).

When the operating system receives a transaction request for a database, the operating system may assign the transaction a step-id. The transaction may requests one or more database operations and may request a commit to apply any updates. As part of the commit request, the transaction may request an advance, which skips the normal release of resources associated with a commit and continues transaction processing. That portion of the transaction that committed before the advance may be applied to the database and remains committed without regard to actions with the step after that point. A new step-id may be generated and assigned to the advanced portion of the database transaction, just as in a new transaction. This may avoid confusion resulting from several independent portions of the step having the same step-id. Furthermore, a step-id for the advance portion may speed any recovery that uses the time portion of the step-id as a start point.

Because the step ID tracks a beginning and an end of a recoverable unit, the step ID is useful during recovery of a database after a failure. When the database fails, such as when an input/output error occurs, a rollback may be performed to recover the database. At the time of the failure, certain steps, identified by a step ID of FIG. 3, may have been in progress of committing to the database. These steps may be contained in a commit-in-progress (CIP) list. The steps may be recorded in an audit trail stored on a storage device, such as a magnetic tape or other non-volatile storage device. The audit trail includes information about recoverable steps for the database. After a failure, the audit trail may be used to reconstruct a database by reapplying all transactions recorded in the audit trail within a certain timeframe.

To avoid applying updates that were rolled back before a step, and reduce the amount of audit trail processed during a recovery, a recovery may occur and retain the same step as before the rollback but include a rollback count. The rollback count may indicate the number of times a particular step ID was previously rolled back. According to one embodiment, the rollback count may be stored in a periodic save record, in which each step ID has a different rollback count in the periodic save record. The periodic save record may be a recording, separate from or stored in the audit trail, created at periodic intervals containing summary snapshots of steps. The creation of a periodic save record may be noted in the audit trail. By processing the periodic save record during a recovery, a database may identify a time in an audit trail for initiating a recovery prior to the last resume point for a step ID without going back in the audit trail to a time before the initial start of the step.

Figure 5:
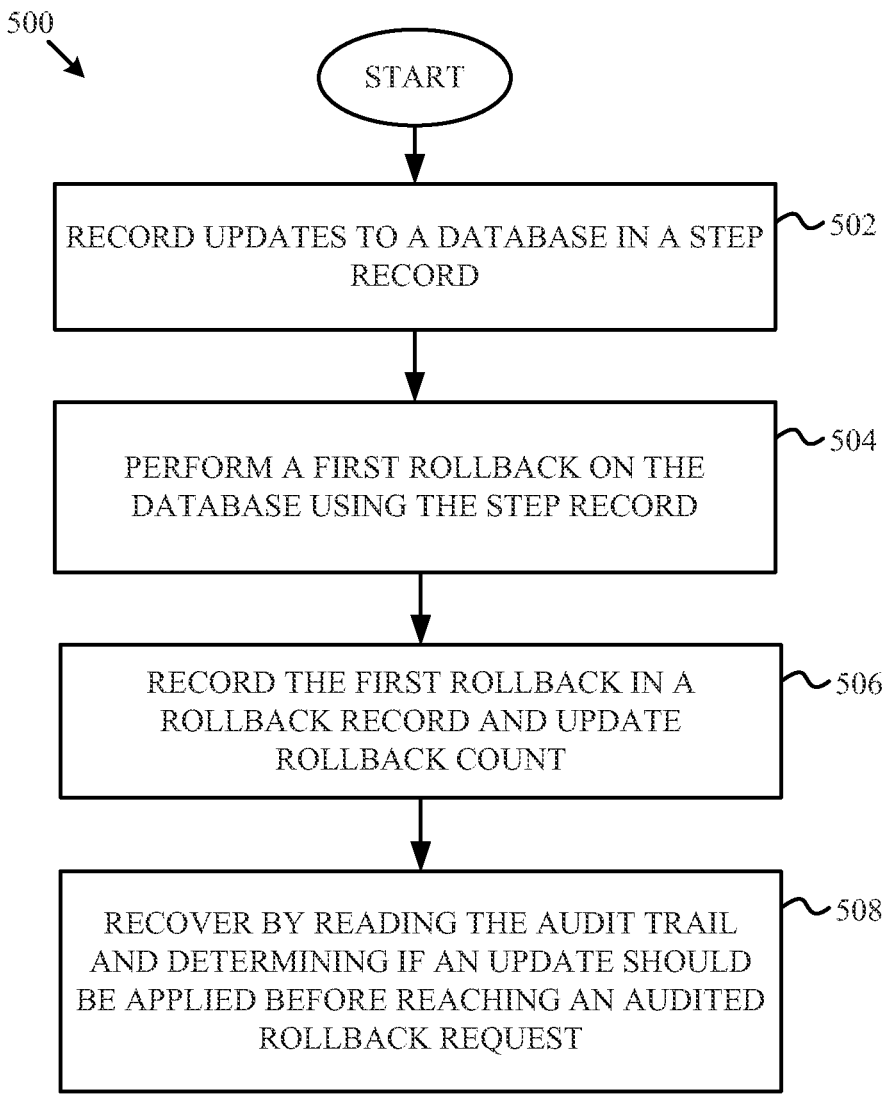
FIG. 5 is a flow chart illustrating an exemplary method for recovering a database from transactions with step identifiers according to one embodiment of the disclosure.

FIG. 5 is a flow chart illustrating an exemplary method for recovering a database from transactions with step identifiers according to one embodiment of the disclosure. A method 500 begins at block 502 with recording updates to a database in a step record, identified by a step ID in an audit trail. At block 504, a first rollback is performed on the database using the step record, which may be recorded in the audit trail with the step ID. The rollback request may include a request to resume. Rollback resume requests may retain the existing step-id, but add a rollback counter. At block 506, the first rollback is recorded in a rollback record, by incrementing the rollback counter. Transactions may be rolled back and resumed one or more times, and later commit to the database. At block 508, a recovery may be performed, which involves reading the audit trail and determining if an update should be applied before reaching an audited rollback request. The rollback counter may be used by the recovery to identify portions of the transaction that rolled back, and thus are not applied during recovery.

FIG. 6 is a block diagram illustrating a periodic save record with rollback counters according to one embodiment of the disclosure. A periodic save record (PSR) 600 may include a table listing step IDs 602 and rollback counts 604 corresponding to the step IDs 602. For example a first step ID may have been rolled back zero times, a second step ID may have been rolled back two times, and a third step ID may have been rolled back one time. The rollback counts may be audited during transaction processing to identify the last rollback performed by any given step. All transactions associated with the step prior to the identified rollback may be discarded.

Because the rollback counter space may have finite storage space, the number of rollbacks allowed by a particular step may be limited. According to one embodiment, only 4000 rollbacks may be allowed for any particular step. Once the counter reaches the rollback limit, an error may be created by a management system for the database.

Figure 7:
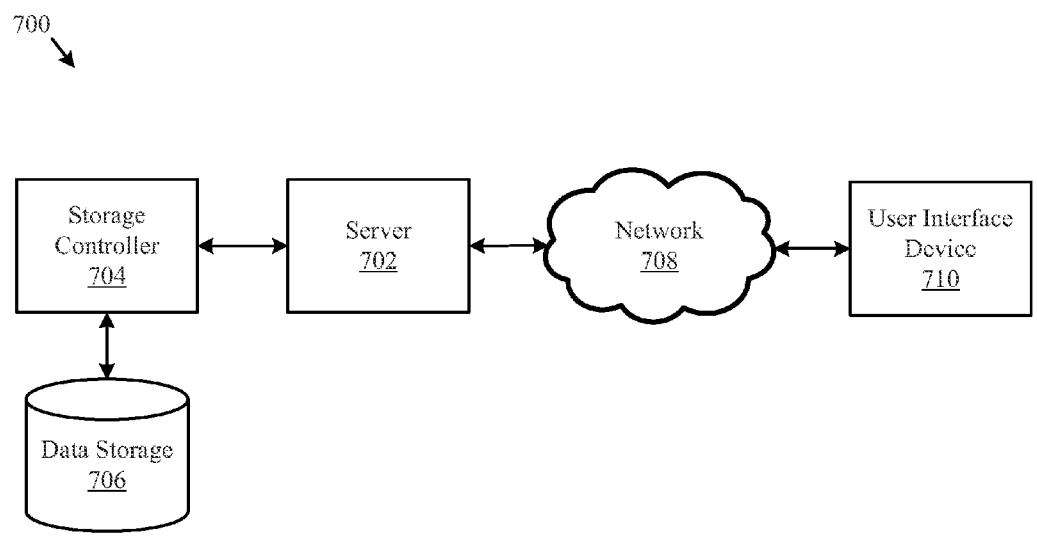
FIG. 7 is a block diagram illustrating a computer network according to one embodiment of the disclosure.

FIG. 7 illustrates one embodiment of a system 700 for an information system, including a system for managing databases. The system 700 may include a server 702, a data storage device 706, a network 708, and a user interface device 710. The server 702 may be a dedicated server or one server in a cloud computing system. The server 702 may also be a hypervisor-based system executing one or more guest partitions. In a further embodiment, the system 700 may include a storage controller 704, or storage server configured to manage data communications between the data storage device 706 and the server 702 or other components in communication with the network 708. In an alternative embodiment, the storage controller 704 may be coupled to the network 708. The data storage device 706 may store a database, an audit trail, and periodic save records identifying step records with a step ID as illustrated in FIG. 3.

In one embodiment, the user interface device 710 is referred to broadly and is intended to encompass a suitable processor-based device such as a desktop computer, a laptop computer, a personal digital assistant (PDA) or tablet computer, a smartphone or other a mobile communication device having access to the network 708. When the device 710 is a mobile device, sensors (not shown), such as a camera or accelerometer, may be embedded in the device 710. When the device 710 is a desktop computer the sensors may be embedded in an attachment (not shown) to the device 710. In a further embodiment, the user interface device 710 may access the Internet or other wide area or local area network to access a web application or web service hosted by the server 702 and provide a user interface for enabling a user to enter or receive information.

The network 708 may facilitate communications of data, such as that stored in databases, between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 710 accesses the server 702 through an intermediate sever (not shown). For example, in a cloud application the user interface device 710 may access an application server. The application server may fulfill requests from the user interface device 710 by accessing a database management system (DBMS). In this embodiment, the user interface device 710 may be a computer or phone executing a Java application making requests to a JBOSS server executing on a Linux server, which fulfills the requests by accessing a relational database management system (RDMS) on a mainframe server.

Figure 8:
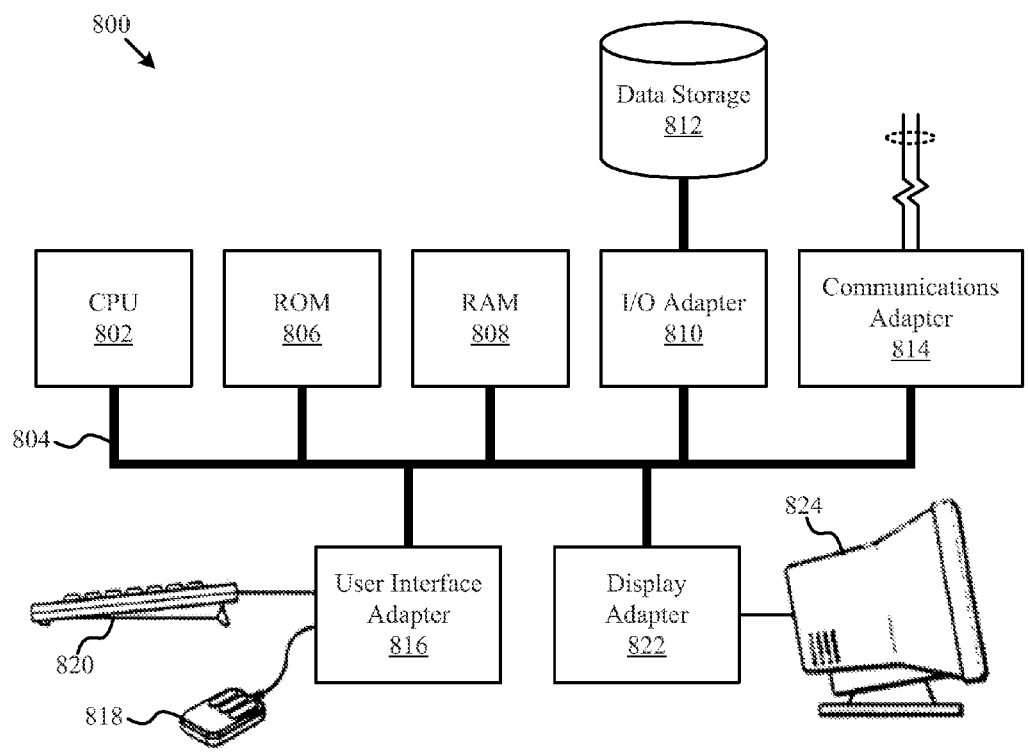
FIG. 8 is a block diagram illustrating a computer system according to one embodiment of the disclosure.

FIG. 8 illustrates a computer system 800 adapted according to certain embodiments of the server 702 and/or the user interface device 710. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 also may include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an input/output (I/O) adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The communications adapter 814 may also be adapted to couple the computer system 800 to other networks such as a global positioning system (UPS) or a Bluetooth network. The user interface adapter 816 couples user input devices, such as a keyboard 820, a pointing device 818, and/or a touch screen (not shown) to the computer system 800. The keyboard 820 may be an on-screen keyboard displayed on a touch panel. Additional devices not shown) such as a camera, microphone, video camera, accelerometer, compass, and or gyroscope may be coupled to the user interface adapter 816. The display adapter 822 may be driven by the CPU 802 to control the display on the display device 824. Any of the devices 802-822 may be physical and/or logical.

The applications of the present disclosure are not limited to the architecture of computer system 800. Rather, the computer system 800 is provided as an example of one type of computing device that may be adapted to perform the functions of a server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

Figure 9A:
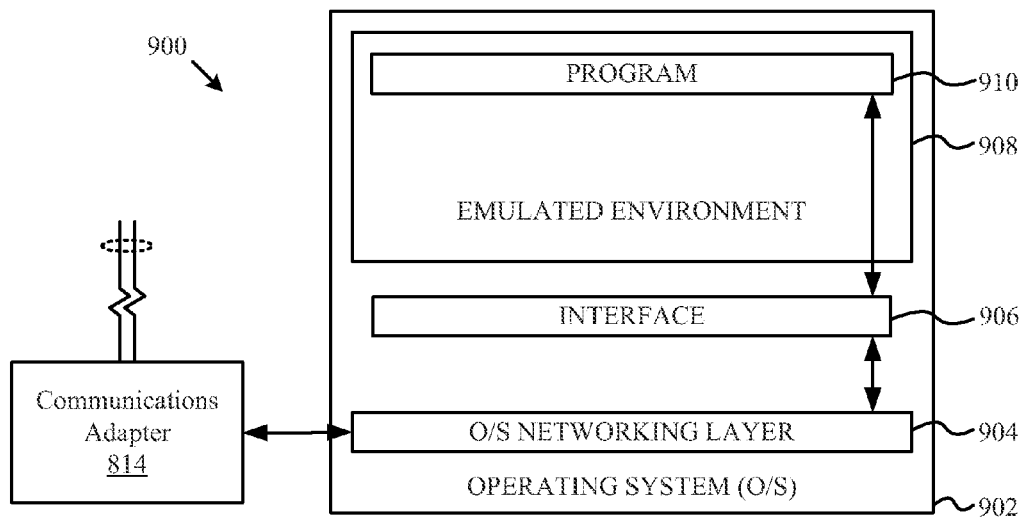
FIG. 9A is a block diagram illustrating a server hosting an emulated software environment for virtualization according to one embodiment of the disclosure.

FIG. 9A is a block diagram illustrating a server hosting an emulated software environment for virtualization according to one embodiment of the disclosure. An operating system 902 executing on a server includes drivers for accessing hardware components, such as a networking layer 904 for accessing the communications adapter 814. The operating system 902 may be, for example, Linux. An emulated environment 908 in the operating system 902 executes a program 910, such as CPCommOS. The program 910 accesses the networking layer 904 of the operating system 902 through a non-emulated interface 906, such as XNIOP. The non-emulated interface 906 translates requests from the program 910 executing in the emulated environment 908 for the networking layer 904 of the operating system 902.

Figure 9B:
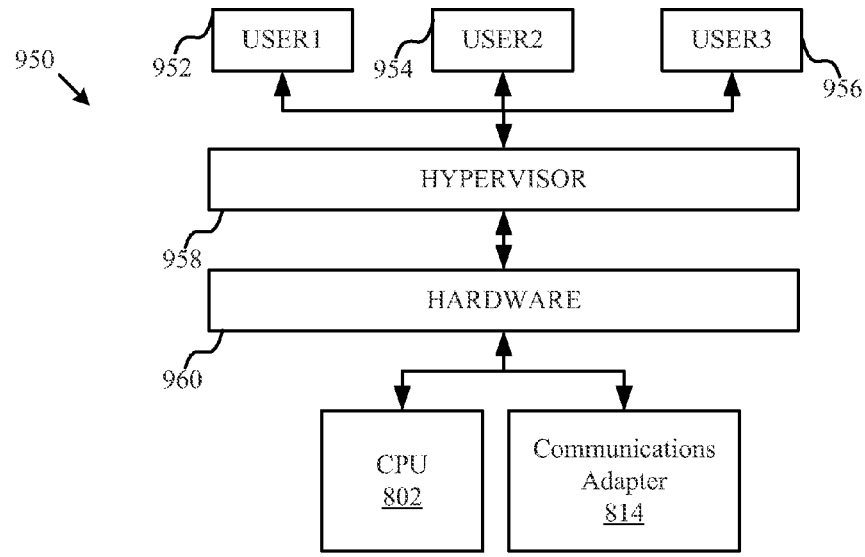
FIG. 9B is a block diagram illustrating a server hosting an emulated hardware environment according to one embodiment of the disclosure.

In another example, hardware in a computer system may be virtualized through a hypervisor. FIG. 9B is a block diagram illustrating a server hosting an emulated hardware environment according to one embodiment of the disclosure. Users 952, 954, 956 may access the hardware 960 through a hypervisor 958. The hypervisor 958 may be integrated with the hardware 960 to provide virtualization of the hardware 960 without an operating system, such as in the configuration illustrated in FIG. 9A. The hypervisor 958 may provide access to the hardware 960, including the CPU 802 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   recording one or more transaction updates to a database, wherein recording comprises assigning to a transaction update a step-id, in which the database is configured to record a step-id in at least two different step-id formats;
   performing a first rollback of database processing on the database using at least one transaction update with assigned step-id, in which the database is capable of performing a first rollback with either of the at least two different step-id formats;
   recording a number of times the one or more transaction updates are rolled back; and
   recovering the database using the one or more transaction updates without applying updates previously rolled back in the first rollback;
   wherein the at least two different step-id formats include:
      a step-id formatted with an identification number set to a time, in a coordinated universal time (UTC) format, that does not change with seasonal offsets and a unique transaction identification value appended to the identification number;
      a step id formatted with a time which is not formatted in coordinated universal time (UTC) format, a sequence number, and an advance number; and
   wherein the step of recording the first rollback comprises incrementing a rollback counter in a rollback record, and in which the step of performing the recovery comprises using the rollback counter to identify portions of the step that rolled back.

2. The method of claim 1, further comprising generating an error when the rollback counter reaches a predetermined value.

3. The method of claim 1, further comprising:
   recording second transaction updates; and
   performing a second rollback of database processing on the database using the second transaction updates.

4. The method of claim 1, further comprising appending the recorded number of times to a periodic save record.

5. A computer program product, comprising:
   a non-transitory computer readable medium comprising:
      code to record one or more transaction updates to a database, wherein recording comprises assigning to a transaction update a step-id, in which the database is configured to record a step-id in at least two different step-id formats; that comprises an identification number set to a time, in a coordinated universal time (UTC) format, that does not change with seasonal offsets and a unique transaction identification value appended to the identification number;
      code to perform a first rollback of database processing on the database using at least one transaction update with assigned step-id, in which the database is capable of performing a first rollback with either of the at least two different step-id formats;
      code to record a number of times the one or more transaction updates are rolled back; and
      code to recover the database using the one or more transaction updates without applying updates previously rolled back in the first rollback; and
      code to increment a rollback counter in a rollback record, and in which the step of performing the recovery comprises using the rollback counter to identify portions of the step that rolled back;
      wherein the at least two different step-id formats include:
         a step-id formatted with an identification number set to a time, in a coordinated universal time (UTC) format, that does not change with seasonal offsets and a unique transaction identification value appended to the identification number; and
         a step id formatted with a time which is not formatted in coordinated universal time (UTC) format, a sequence number, and an advance number.

6. The computer program product of claim 5, in which the medium further comprises code to generate an error when the rollback counter reaches a predetermined value.

7. The computer program product of claim 5, in which the medium further comprises code to record second transaction updates and code to perform a second rollback of database processing on the database using the second transaction updates.

8. The computer program product of claim 5, in which the medium further comprises code to append the recorded number of times to a periodic save record.

9. An apparatus, comprising:
   a memory for storing a database; and
   a processor coupled to the memory, in which the processor is configured:
      to record one or more transaction updates to a database, wherein recording comprises assigning to a transaction update a step-id, in which the database is configured to record a step-id in at least two different step-id formats; that comprises an identification number set to a time, in a coordinated universal time (UTC) format, that does not change with seasonal offsets and a unique transaction identification value appended to the identification number;
      to perform a first rollback of database processing on the database using at least one transaction update with assigned step-id, in which the database is capable of performing a first rollback with either of the at least two different step-id formats;
      to record a number of times the one or more transaction updates are rolled back;
      to recover the database using the one or more transaction updates without applying previously rolled back updates; and to increment a rollback counter in a rollback record, and in which the step of performing the recovery comprises using the rollback counter to identify portions of the step that rolled back;

wherein the at least two different step-id formats include:

a step-id formatted with an identification number set to a time, in a coordinated universal time (UTC) format, that does not change with seasonal offsets and a unique transaction identification value appended to the identification number; and a step id formatted with a time which is not formatted in coordinated universal time (UTC) format, a sequence number, and an advance number.

10. The apparatus of claim 9, in which the processor is further configured to generate an error when the rollback counter reaches a predetermined value.

11. The apparatus of claim 9, in which the processor is further configured to record second transaction updates and to perform a second rollback of database processing on the database using the second transaction updates.

12. The apparatus of claim 9, in which the processor is further configured to append the recorded number of times to a periodic save record.

* * * * *